US006553278B2

United States Patent
Handroos et al.

(10) Patent No.: US 6,553,278 B2
(45) Date of Patent: Apr. 22, 2003

(54) METHOD FOR GUIDING A BOOM AND A SYSTEM FOR GUIDING A BOOM

(75) Inventors: Heikki Handroos, Lappeenranta (FI); Janne Kovanen, Lappeenranta (FI)

(73) Assignee: Timberjack Oy, Tampere (FI)

( * ) Notice: Subject to any disclaimer, the term of this patent is extended or adjusted under 35 U.S.C. 154(b) by 0 days.

(21) Appl. No.: 09/908,385

(22) Filed: Jul. 18, 2001

(65) Prior Publication Data

US 2002/0008075 A1 Jan. 24, 2002

(30) Foreign Application Priority Data

Jul. 18, 2000 (FI) ............................................. 20001682

(51) Int. Cl.$^7$ ................................................. G06F 7/00
(52) U.S. Cl. ........................ 700/213; 700/253; 212/272
(58) Field of Search ........................ 212/272; 700/213, 700/61, 63, 71, 245, 253, 256, 258, 260; 318/606, 607

(56) References Cited

U.S. PATENT DOCUMENTS

| 3,624,783 | A | * | 11/1971 | Chang .......................... 254/275 |
| 4,395,904 | A | * | 8/1983 | Ivanov et al. .................. 318/617 |
| 4,603,286 | A | * | 7/1986 | Sakano .......................... 318/572 |
| 4,804,896 | A | * | 2/1989 | Shepard et al. .......... 318/568.24 |
| 4,808,063 | A | * | 2/1989 | Haley .......................... 318/567 |
| 4,815,614 | A | | 3/1989 | Putkonen et al. |
| 4,980,625 | A | | 12/1990 | Shimada |
| 5,117,992 | A | * | 6/1992 | Simkus et al. ............... 212/275 |
| 5,598,090 | A | * | 1/1997 | Baker et al. ............. 273/148 B |
| 5,617,515 | A | * | 4/1997 | MacLaren et al. ............. 414/5 |
| 5,785,191 | A | | 7/1998 | Feddema et al. |
| 5,960,969 | A | * | 10/1999 | Habisohn ..................... 212/270 |
| 6,025,686 | A | * | 2/2000 | Wickert et al. ......... 318/568.18 |
| 6,371,214 | B1 | * | 4/2002 | Anwar et al. ................... 172/1 |

* cited by examiner

*Primary Examiner*—Khoi H. Tran
(74) *Attorney, Agent, or Firm*—Quarles & Brady LLP

(57) ABSTRACT

The invention relates to a method for guiding the boom (3) of a working machine in connection with the handling of a load, in which method the movements of the load are controlled by means of a control signal formed by at least one control means (9), one or several measurement signals are generated to determine information related to at least the load mass and/or the boom movement, and said at least one control signal is filtered. In the method, the filtering applies a filtering function of the second or a higher order, comprising at least one parameter which can be set, and the method also comprises at least the following steps:

a determining step to determine at least one specific oscillation frequency of the boom on the basis of said measurement signals, a setting step, in which at least one specific oscillation frequency determined in the determining step is used to set at least one parameter for a filtering function, a filtering step, in which said control signal is filtered with said filtering function to form a control signal, and a control step, in which said control signal is used to guide the movement of the boom (3).

15 Claims, 3 Drawing Sheets

METHOD FOR GUIDING A BOOM AND A SYSTEM FOR GUIDING A BOOM

FIELD OF THE INVENTION

The present invention relates to a method for guiding a boom as set forth in the preamble of the appended claim 1, as well as a system for guiding a boom as set forth in the preamble of the appended claim 8.

Lifting devices are used, for example, for transferring loads in various loading situations. Such lifting devices are often provided with a boom, by which the extension of the lifting device can be improved, compared with fixed lifting devices. Furthermore, such a boom is normally mounted on its support frame in such a way that the boom has at least two degrees of freedom. For example, the boom is arranged to be rotatable in relation to its support frame, and in addition to this, the angle of inclination of the boom can be adjusted in the vertical direction. Furthermore, the boom is often formed of two or more boom parts arranged to be movable in relation to each other, which improves the use of the boom for the transfer of loads. The boom parts may be formed in such a way that, if necessary, they move within each other, i.e. they form a so-called telescopic structure, or in such a way that the boom parts are connected to each other in an articulated manner, wherein the angle between the boom parts can be adjusted in at least one direction. Various combinations of the above-mentioned structures are also known.

Furthermore, the boom is typically provided with a lifting means, by which the load to be handled can be gripped. This lifting means can be, for example, a hook, a lifting fork, or the like. This lifting means is preferably either fixed to the boom in an articulated manner, or the lifting means is fixed to a lifting gear by means of a wire rope or the like.

At the stage when the required transfer work is to be carried out, the boom is guided so that the load to be transferred can be fixed to the lifting means. After this, by controlling the movements of the boom, the actual hoisting and transfer work is carried out to transfer the load to a desired location. Due to certain physical factors, such as mass inertia, this hoisting and transfer stage has various undesired force effects on the boom, such as jerks and oscillation. These force effects may cause a jerking motion in the boom, bouncing of the goods to be transferred, etc. These undesired force effects are directed, for example, to the boom control means, such as control cylinders, and may cause early defects in these control means. Furthermore, the fastenings of the boom may be impaired and cause danger situations. Thus, when transferring the load, these jerking and bouncing movements should be avoided, wherein when moving the load, the person operating the lifting device must see that too quick hoisting and transfer movements are not performed. Thus, it is not possible to use the maximum hoisting and transfer speed when moving loads.

BACKGROUND

Some solutions have been developed to reduce undesired force effects on the boom. For example, U.S. Pat. No. 4,815,614 presents a boom control system, in which the pressure of the boom lifting cylinder is monitored and when the pressure exceeds a certain limit, the maximum opening of the control valve of the lifting cylinder, i.e. the maximum speed of the cylinder, is limited linearly in relation to the increase in the pressure. This system is intended to limit the maximum speed of the boom in the range critical in view of the loads, and it is primarily intended to protect the boom.

Japanese patent publication JP 5-321297 presents an active dynamic power feedback for controlling the cylinder of an excavator boom. This is implemented by means of a separate electrical hydraulic system. In this system, the dynamic force and position have a 180° phase difference from each other. Thus, the power feedback attenuates the oscillation of the boom. The dynamic force is calculated by high-pass filtering the feedback signal formed from the pressures of the lifting cylinder. The gain of the feedback is a function formed on the basis of the static force of the cylinder. The static force is obtained by low-pass filtering the power feedback. Thus, this is an active method for attenuating the oscillation.

U.S. Pat. No. 5,638,267 discloses a method and a device for avoiding undesired dynamic phenomena in a closed control circuit. In the method presented in this publication, a series of impulses is formed, which is advantageous in view of avoiding oscillation and which is used to adjust the control by the control device. This series of impulses can be generated by dividing the original control into smaller units with a given amplitude and time difference. These amplitudes and time differences are obtained by minimizing a specific oscillation equation. This method, however, for calculating the control, uses precalculated conditions and formulas in such a way that this method is not applicable for the handling of variable loads in real time.

SUMMARY OF THE INVENTION

It is an aim of the present invention to provide a method for controlling a boom and a system for controlling a boom, in which the aim is to make the load transfer rate as high as possible, but without causing oscillation, jerks or other undesired force effects on the boom to a significant degree. The invention is based on the idea of forming at least second degree filtering functions, whose properties, such as the frequency band, are dynamically adjusted on the basis of control variables obtained from sensors. The method according to the present invention is primarily characterized in that the filtering applies a filtering function of the second or a higher order, comprising at least one parameter that can be set, and that the method further comprises at least the following steps: a determining step to determine at least one specific oscillation frequency of the boom on the basis of said measurement signals; a setting step, in which at least one specific oscillation frequency determined in the determining step is used to set at least one parameter for a filtering function; a filtering step, in which said control signal is filtered with said filtering function to form a control signal; and a control step, in which said control signal is used to guide the movement of the boom. The boom control system according to the present invention is primarily characterized in that the filter is a filter of the second or a higher order, whose at least one parameter is arranged to be set, and that the control system further comprises at least determining means for determining at least one specific oscillation frequency of the boom on the basis of said measurement signals; setting means for setting at least one parameter for a filtering function on the basis of at least one specific oscillation frequency determined at the determining step; and control means for controlling the movements of the boom with said control signal.

By means of the present invention, considerable advantages are achieved when compared to methods and boom control systems of prior art. By the method of the invention, the acceleration and deceleration of the boom can be increased more than is possible in prior art systems, but without causing harmful force effects on the boom. Thus, the lifting and transfer work can be speeded up, reducing the time required for the lifting and transfer work. As the harmful force effects on the boom are significantly reduced, also the need for maintaining and repairing the boom will reduce and its service life will be prolonged. Moreover, danger situations cannot occur as easily as in prior art solutions.

BRIEF DESCRIPTION OF THE DRAWINGS

In the following, the invention will be described in more detail with reference to the appended drawings, in which.

DETAILED DESCRIPTION OF THE PREFERRED EMBODIMENT

Figure 1:
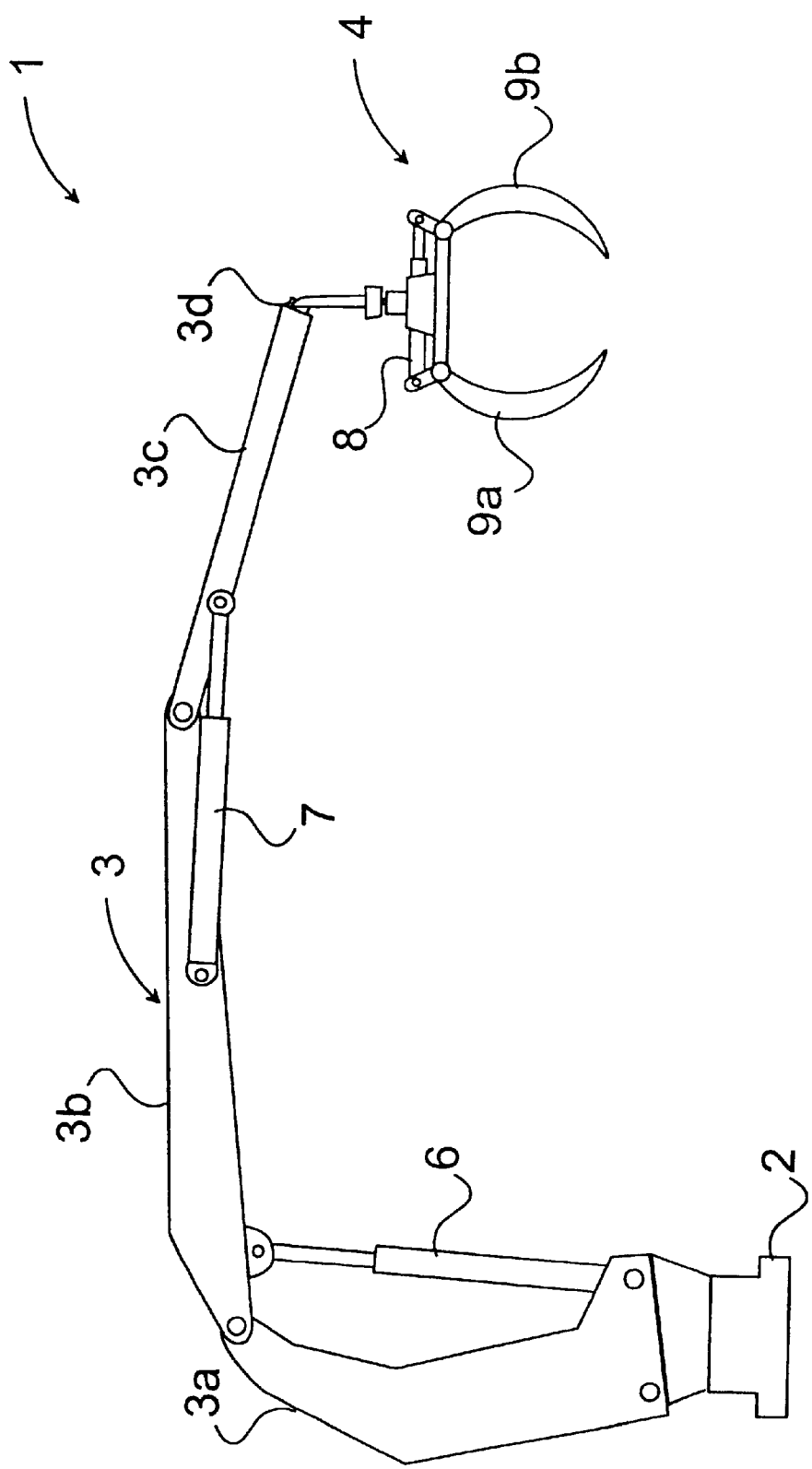
FIG. 1 shows a prior art lifting device with a boom.

The lifting device 1 shown in FIG. 1 is a typical example of a lifting device used particularly in forest machinery. The lifting device 1 comprises fixing means 2, whereby the boom 3 is fixed, for example, to the frame structure of a working machine (not shown), such as a forest machine, or the like. In this embodiment, the boom 3 comprises three boom parts 3a, 3b, 3c, but it is obvious that there can be fewer or more of these boom parts than those presented herein. The third boom part may preferably be such whose length can be adjusted, if necessary. This can be achieved, for example, with a telescopic structure, wherein an extension part (not shown) is provided within the third boom part 3c. At one end 3d of the third boom part 3c, or of the extension part if an adjustable third boom part is used, there is fixed a lifting device 4, by means of which it is possible to grip the load to be transferred, such as logs, for lifting and transferring. This lifting device 4 is fixed, for example, in an articulated manner to the third boom part 3c of the boom. The boom 3 is preferably connected to the fixing means 2 in an at least rotatable and swivellable manner. The angle between the first boom part 3a and the second boom part 3b of the boom can be controlled with a first cylinder 6. In a corresponding manner, the second boom part 3b and the third boom part 3c are connected at one end to each other in an articulated manner, and the angle between the second boom part 3b and the third boom part 3c can be adjusted with a second cylinder 7. Furthermore, the lifting device 4 comprises means, whereby the gripping means 9a, 9b of the lifting device 4 can be moved in relation to each other to grip and release the load. These means comprise, for example, a third cylinder 8.

The cylinders 6, 7 controlling the movements of the boom parts 3a, 3b, 3c are preferably hydraulic cylinders. In the control of the operation of the hydraulic cylinders, a pressurized medium is used, whose flow between the cylinders 6, 7 and a feed pump 18 (FIG. 2) is controlled e.g. by means of hydraulic hoses 20, 21a, 21b, or the like, as well as with valves. The flow of the hydraulic fluid into and from the cylinders 6, 7 is controlled to achieve a desired force effect and movement into the cylinders 6, 7. The valves 19a, 19b are preferably pressure-compensated proportional valves. Thus, the motional speeds of the cylinders 6, 7 are proportional to the angle of the control stick, ie. to the control signal formed by the control stick 9.

According to the basic rules of mechanical dynamics, the frequency content of the excitation of the dynamic system should not exceed about 30% of the lowest specific frequency of the system, to form no resonance oscillation. The lowest specific frequency of the boom of the lifting device depends on the mass and the position of the boom. If the lowest specific frequencies are known as a function of the mass and the cylinder positions or the joint angles of the boom parts, it is possible to change, for example, the filtering frequency of the filtering function of the second order in such a way that no such excitations from the control sticks can enter the boom which exceed said 30% of the prevailing specific frequency. To achieve this, sensors 13, 14 (FIG. 2) are used to measure the position of each boom part 3a, 3b, 3c as well as the mass of the load to be lifted.

Figure 2:
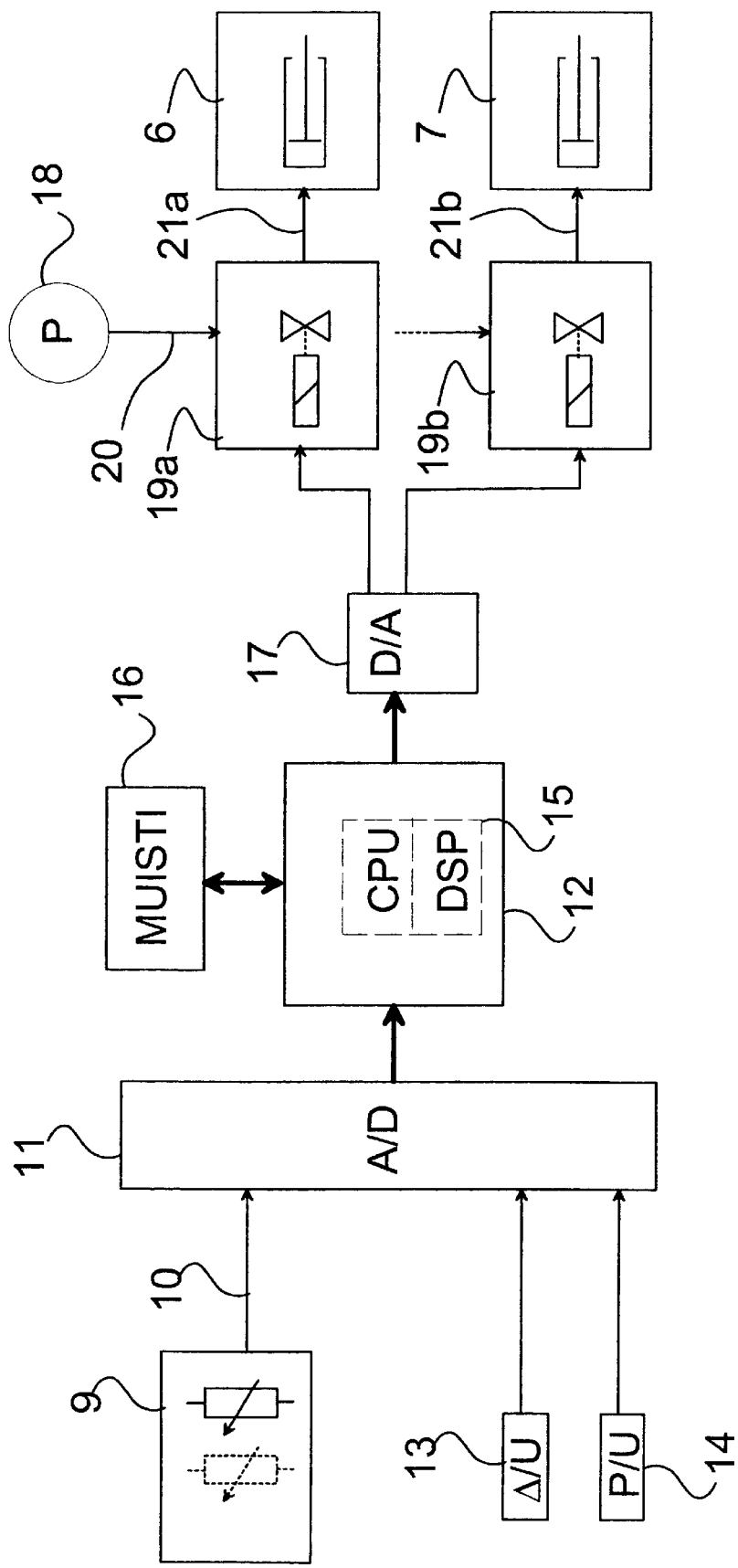
FIG. 2 shows, in a reduced chart, a boom control system according to a preferred embodiment of the invention.
Figure 3:
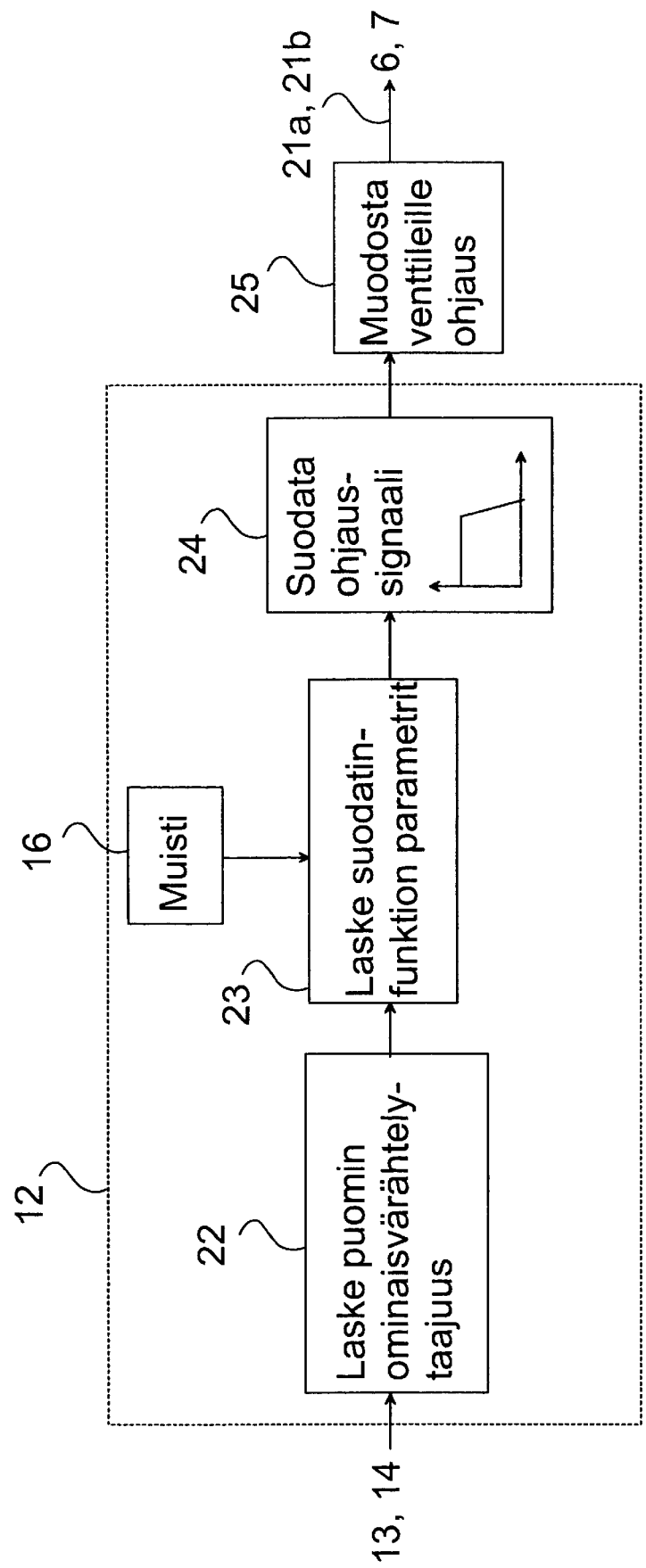
FIG. 3 shows, in a reduced chart, the system according to an advantageous embodiment of the invention, for controlling a cylinder in a control system of FIG. 2.

FIG. 2 shows an advantageous embodiment of the control system according to the invention, and FIG. 3 illustrates, in a reduced chart, the method according to an advantageous embodiment of the invention, for controlling a cylinder in the control system of FIG. 2. The operator of the lifting device gives control commands preferably by means of one or more control sticks 9. One prior art control stick operates in such a way that it generates one or more control signals proportional to the movement of the control stick, such as a voltage, in a control line 10. Thus, when the control stick is in the centre position, the voltage in the control line 10 is advantageously substantially at the centre of a given voltage range. In a corresponding manner, the movement of the control stick produces a change in the voltage in the control line 10, wherein the magnitude of the change in the voltage (=absolute value of the angle of the control stick in relation to the centre position) indicates the desired speed of motion, and the direction of the change in the voltage indicates the desired direction of motion. In practical applications, bidirectional (X, Y) control is often used, wherein the movement of the stick to the left/right produces a change in the first control signal and, in a corresponding manner, the movement of the stick forward/backward produces a change in the second control signal.

The one or more control signals generated by the control stick 9 are led by means of the control line 10 via an analog-to-digital converter 11 to the control means 12. Via the analog-to-digital converter 11, also measurement data formed by the sensors 13, 14 are preferably led to the control block 12 to be analyzed and used in the adjustment of the cylinders 6, 7. The sensors 13, 14 are used to measure e.g. the weight (mass) of the load as well as the positions of the boom parts 3a, 3b, 3c. For measuring the weight of the load, it is possible to use e.g. a pressure sensor 14 arranged in connection with the lifting device or the cylinder. The measurement of the mutual position of the boom parts 3a, 3b, 3c can be made, for example, by measuring the position of the piston of the cylinders 6, 7 with the movement sensor 13.

For processing the measurement data formed by the sensors 13, 14, the measurement data are, if necessary, converted from the analog into the digital form by means of the analog-to-digital converter 11. The analog-to-digital converter 11 transfers the measurement data of the sensors in digital format into the control block 12 which preferably comprises at least one processor 15, such as a microprocessor CPU and/or a digital signal processing unit DSP. Sensors are also known, which give the measurement signal already in digital format, wherein no analog-to-digital conversion needs to be made. Thus, the measurement data can be transferred from the sensors 13, 14 preferably directly to the control block 12, which is prior art known by anyone skilled in the art.

On the basis of the measurement data, the processor 15 determines the load mass and the position of the boom parts 3a, 3b, 3c. On the basis of the changes in the position of the boom parts 3a, 3b, 3c and the time passed during the changes in the position, it is also possible to calculate the speed and acceleration rate of the boom parts 3a, 3b, 3c at each time. After this, the processor 15 preferably calculates the lowest specific oscillation frequency for the boom (block 22 in FIG. 3).

On the basis of the calculated lowest specific oscillation frequency, the processor changes (block 23), if necessary, the parameters of the filtering function to change the frequency band of the filter. If the specific oscillation frequency of the boom is reduced, the upper limit of the frequency band is lowered, and if the specific oscillation frequency is increased, the upper limit of the frequency band can also be raised.

The control unit 12, preferably the processor 15, is provided with at least one such filtering function, whereby the control signal generated by the control stick 9 is filtered (block 24). In this boom control system according to the invention, the filtering function to be selected is linear digital approximation of a dynamic system of the second order. Such a filtering function of the second order, which is preferably a low-pass filtering function, provides a significant improvement in the acceleration of the boom, compared with known ramp and first order low-pass filtering functions, but without causing jerks or oscillation in the boom. Consequently, the filtering function takes care that if the operator transfers the control stick too fast in relation to the specific oscillation frequency of the boom, the control signal to be transferred to the cylinders is changed more slowly than the change in the control. However, the rate of change in the control signal is greater than can be achieved with solutions of prior art.

On the basis of the control signal formed by the filtering function, the control means 12 further converts the control signal into a form which is suitable for valves 19a, 19b controlling the cylinders of the boom (block 25). For clarity, FIG. 2 only shows two valves 19a, 19b and two cylinders 6, 7, but it is obvious that the same principle can also be applied in the control of other cylinders or actuators belonging to the boom control system.

The control signal formed by the filtering function is converted e.g. to analog format by a digital-to-analog converter 17 and is transferred further to the electrically controllable valves 19a, 19b which control the flow of the pressurized medium from the feeding pump 18 via pressurized medium hoses 20, 21a and 21b to the cylinders 6, 7 controlling the boom parts 3a, 3b, 3c. If the valves 19a, 19b used are digitally controllable valves, the control signal does not need to be converted to analog format, but it can be transmitted to the valves 19a, 19b in digital format.

The processor 15 is provided with control software as well as with filtering software for analyzing the sensor measurement data and for controlling the filtering frequency of the filtering function on the basis of these measurement variables. The application software is stored in a memory 16. Furthermore, for setting the parameters of the filtering function, there is preferably a table, a set of specific curves or the like stored in the memory, representing the change of the specific frequency of the boom in relation to the load mass and the positions of the boom parts.

The sensor data are used to monitor the change in the specific frequency of the boom, and this is used to adjust the filtering frequency of the filtering function. It is thus possible to control the movements of the boom adaptively and to prevent harmful controls from entering the boom cylinders 6, 7, 8.

The present invention is not limited solely with respect to the above-presented embodiments, but it can be modified within the scope of the appended claims.

What is claimed is:

1. A method for controlling a boom (3) in a working machine in connection with handling of a load, in which method the movements of the load are controlled with a control signal formed by at least one control means (9), one or several measurement signals are formed to determine information related to at least the load mass and/or the boom movement, and said at least one control signal is filtered, characterized in that according to the method, the filtering applies a filtering function of the second or a higher order, comprising at least one parameter that can be set, and that the method further comprises at least the following steps:

a determining step to determine at least one specific oscillation frequency of the boom on the basis of said measurement signals, a setting step, in which at least one specific oscillation frequency determined in the determining step is used to set at least one parameter for a filtering function, a filtering step, in which said control signal is filtered with said filtering function to form a control signal, and a control step, in which said control signal is used to guide the movement of the boom (3).

2. The method according to claim 1, characterized in that the movement of the boom is controlled with one or more cylinders (6, 7).

3. The method according to claim 2, characterized in that said cylinders (6, 7) are cylinders operated by a pressurized medium, wherein the flow of the pressurized medium into said cylinders (6, 7) is controlled with valves (19a, 19b), preferably proportional valves.

4. The method according to claim 1, 2, or 3 characterized in that in the determining step, the at least one specific oscillation frequency which is determined includes at least the lowest specific oscillation frequency for the boom.

5. The method according to any of the claims 1 to 3, characterized in that in the setting step, the filtering frequency of the filtering function is set.

6. The method according to claim 5, characterized in that the filtering function used is low-pass filtering of the second order, wherein the upper frequency limit of the filtering function is set into a value which is determined on the basis of the lowest specific frequency of the boom.

7. The method according to claim 6, characterized in that the upper frequency limit of the filtering function is set into a value which substantially does not exceed 30% of the lowest specific frequency of the boom.

8. A boom control system to be used in the control of the boom (3) of a working machine in conneciton with handling of a load, the control system comprising at least one control means (9) which is arranged to generate at least one control signal (10) for controlling the movements of the load, means (13, 14) for generating one or more measurement signals for determining information related to at least the load mass and/or the boom movement, and at least one filter for filtering the control signal, characterized in that the filter is a filter of the second or a higher order, whose at least one parameter is arranged to be set, and that the control system further comprises at least:

determining means (13, 14, 15) for determining at least one specific oscillation frequency of the boom on the basis of said measurement signals, setting means (15) for setting at least one parameter for a filtering function on the basis of at least one specific oscillation frequency determined at the determining step, and control means (17, 19a, 19b) for controlling the movements of the boom (3) with said control signal.

9. The boom control system according to claim 8, characterized in that the movement of the boom is controlled with one or more cylinders (6, 7).

10. The boom control system according to claim 9, characterized in that said cylinders (6, 7) are cylinders operated by a pressurized medium, wherein the control system also comprises at least one valve (19a, 19b), preferably a proportional valve, for controlling the flow of the pressurized medium into said cylinders (6, 7).

11. The boom control system according to claim 8, 9, or 10, characterized in that the at least one specific oscillation frequency which is determined includes at least the lowest specific oscillation frequency of the boom.

12. The boom control system according to any of the claims 8 to 10, characterized in that at least the lowest specific oscillation frequency of the boom is arranged to be determined.

13. The boom control system according to claim 12, characterized in that the filtering function used is low-pass filtering of the second order, wherein the upper frequency limit of the filtering function is set into a value which is determined on the basis of the lowest specific frequency of the boom.

14. The boom control system according to claim 13, characterized in that the upper frequency limit of the filtering function is set into a value which substantially does not exceed 30% of the lowest specific frequency of the boom.

15. The boom control system according to any of the claims 8 to 14, characterized in that the boom comprises two or more boom parts (31, 3b, 3c), wherein the control system comprises means (6, 7, 19a, 19b, 20, 21a, 21b) for controlling the movements of each boom part (3a, 3b, 3c).

\* \* \* \* \*

UNITED STATES PATENT AND TRADEMARK OFFICE
CERTIFICATE OF CORRECTION

PATENT NO.    : 6,553,278 B2
DATED         : April 22, 2003
INVENTOR(S)   : Heikki Handroos et al.

It is certified that error appears in the above-identified patent and that said Letters Patent is hereby corrected as shown below:

<u>Column 8,</u>
Line 12, "14" should be -- 10 --.

Signed and Sealed this

Twenty-eighth Day of October, 2003

JAMES E. ROGAN
*Director of the United States Patent and Trademark Office*